Feb. 11, 1964     R. I. GENIN     3,120,777
SCORING AND CUTTING MACHINE
Filed Aug. 10, 1961     2 Sheets-Sheet 1
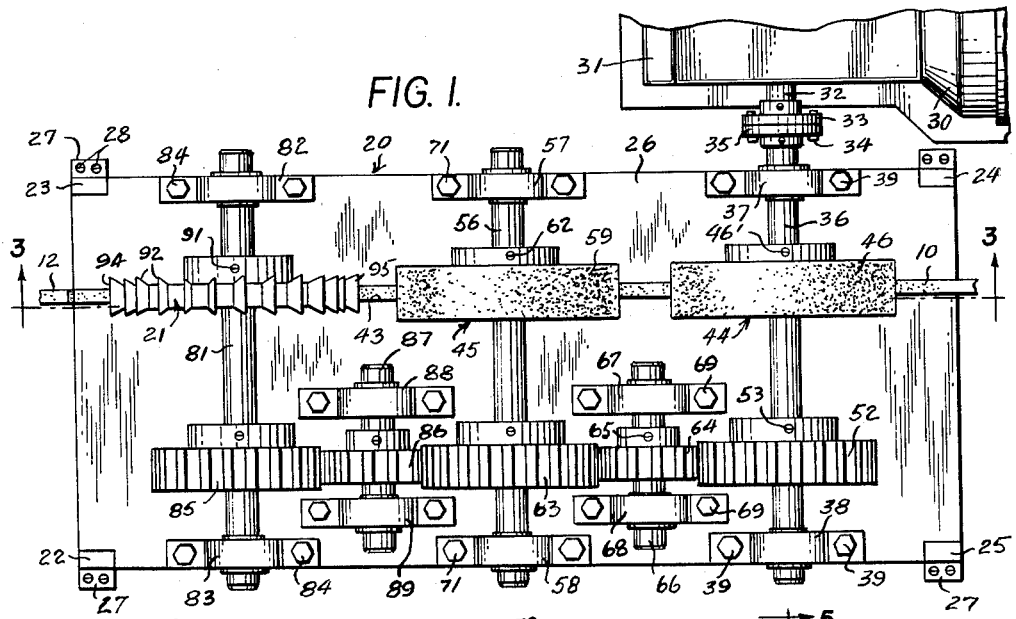
INVENTOR.
ROBERT I. GENIN
BY
L. S. Saulebury
ATTORNEY.

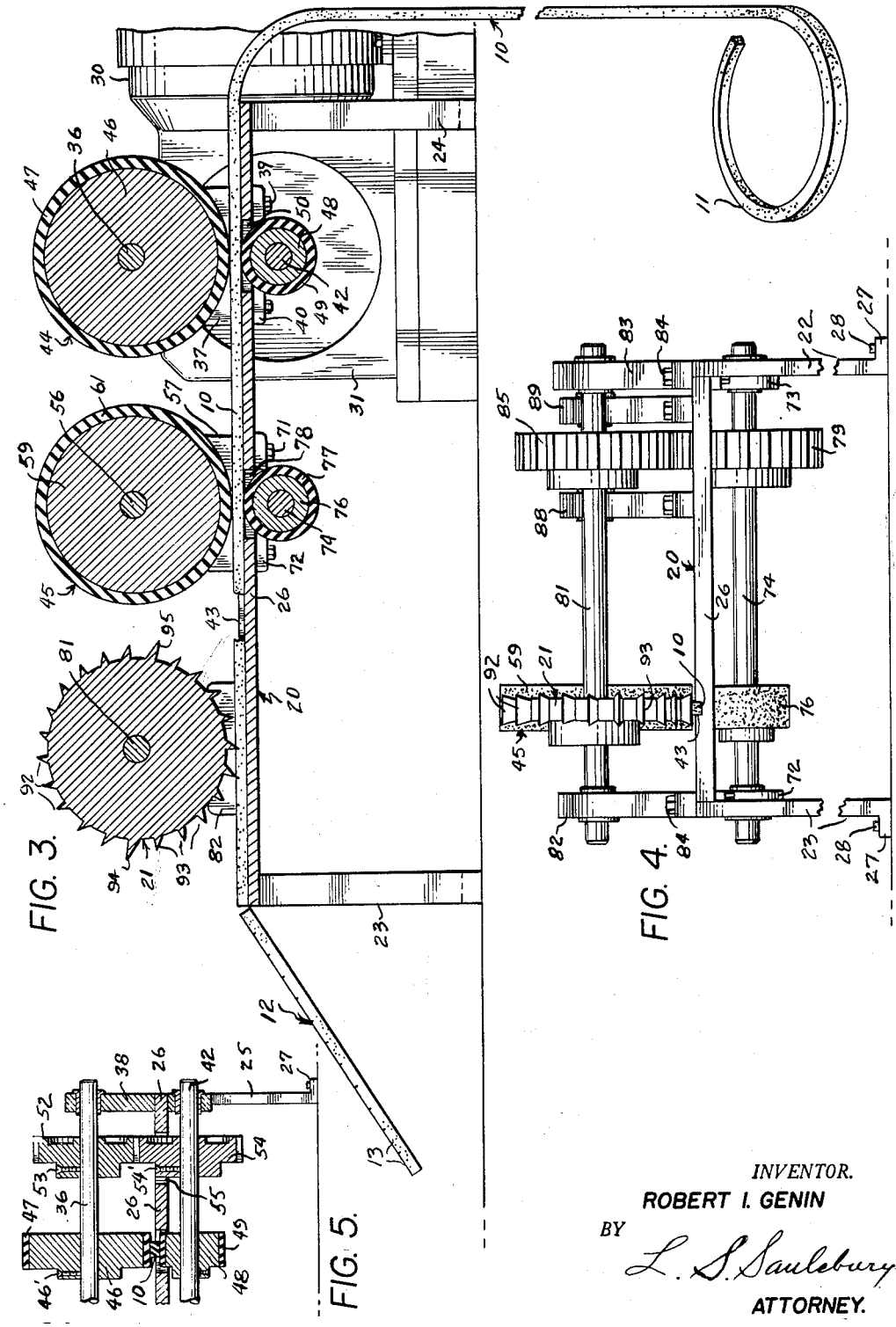

United States Patent Office 3,120,777
Patented Feb. 11, 1964

3,120,777
SCORING AND CUTTING MACHINE
Robert I. Genin, New Rochelle, N.Y., assignor to Child Guidance Toys, Inc., Bronx, N.Y., a corporation of New York
Filed Aug. 10, 1961, Ser. No. 130,621
1 Claim. (Cl. 83—11)

This invention relates to a scoring and cutting machine particularly adapted to score and cut into stick lengths continuous rubber-like strip material.

It is the principal object of the present invention to provide a machine for scoring and cutting into stick lengths rubber-like strip material extended from a roll of this material that is more or less of a breakable or brittle nature and embodying a hundred or more feet of the same, which will score and sever the material into stick lengths evenly and uniformly without breakage.

It is another object of the invention to provide a scoring and cutting machine for rubber-like strip material in which the material while being worked on and forced through the machine is maintained in a groove within a flat surface, and in which the propelling rolls will engage top and bottom side of the strip while being run through the groove whereby the strip material will be maintained straight and true while being worked upon and extended through the machine.

It is still another object of the invention to provide a scoring and cutting machine for rubber-like strip material in which both the scoring and cutting operations are performed with a solitary scoring and cutting wheel, this wheel having short teeth for effecting the scoring operation upon the surface of the strip material and longer teeth corresponding to the scoring teeth for effecting the severing of the strip material into stick lengths.

It is a further object of the invention to provide a scoring and cutting machine for rubber-like strip material in which the drive for upper and lower propelling rolls and for the scoring and cutting wheel is made through a compact train of gears in which the gears are carried on the propelling rolls and scoring and cutting wheel, the gears of the propelling rolls and the wheel being joined by intermediate small pinion gears, whereby the overall effective length of the machine and the extent of the strip material that is being propelled and worked upon is kept to a minimum.

Other objects of the present invention are to provide a scoring and cutting machine for rubber-like strip material, having the above objects in mind, which is of simple construction, has a minimum number of parts, driven by single drive mechanism, compact, durable, easy to lubricate, accurate and precise, easy to maintain and replace parts, continuous and speedy in operation, consumes little space, durable and efficient and effective in use.

For a better understanding of the invention, reference may be had to the following detailed description taken in connection with the accompanying drawing, in which:

FIGURE 1 is a top plan view of the scoring and cutting machine embodying the features of the invention, FIG. 2 is a side elevational view of the machine, FIG. 3 is a longitudinal and sectional view of the scoring and cutting machine as viewed on line 3—3 of FIG. 1, FIG. 4 is an end elevational view of the scoring and cutting machine as viewed from the discharge end thereof, FIG. 5 is a fragmentary vertical sectional view of the machine taken through one set of the propelling rolls and as viewed generally on line 5—5 of FIG. 2, FIGS. 6 and 7 are respectively top and side elevational views of a scored and severed stick length of the rubber-like strip material, as formed by the machine, and FIG. 8 is an enlarged vertical sectional view of the stick length as viewed on line 8—8 of FIG. 7.

In a co-pending patent application, Serial No. 112,725, filed May 25, 1961, of the present inventor and Murray D. Zak, there is disclosed and claimed the method of preparing stick lengths of scored magnetic rubber-like pieces and the assembling of these pieces into plastic confiurations. According to this invention, the machine for so scoring and cutting the stick lengths from the more or less brittle and compressible rubber-like magnetic strip material is to be disclosed and claimed.

This rubber-like strip material as indicated at 10 comes in the form of a roll or bundle 11 from an extrusion mill in lengths up to one or more hundred feet. This rubber-like strip material is yieldable and compressible and more or less brittle, like hard rubber and can be easily broken because of its small cross section dimensions and if properly handled on being fed in a machine for the purpose of being scored and cut, can be kept unbroken except at the severed locations. The long strip as provided by the roll of this material is to be severed into the stick lengths of FIGS. 6 and 7 of substantially the actual length and size in width and height to be handled in the assembling of the individual magnetic bar pieces 13 set off from one another by scorings 14, these sticks being used in the loading of the configurations with bar pieces in the manner best shown in the above entitled co-pending application.

In FIG. 8, the magnetic bar piece is shown in double size section. The magnetic piece has a bottom face 15 with a groove 16 running throughout the length thereof, and side assembling and locking grooves 18 in the opposite sides thereof and more adjacent to top surface 19 of the magnetic piece. Magnetic particles are embedded in the rubber piece adjacent to the bottom face 15 and the groove 16 running therealong separates the bottom face 15 into North and South polarity N and S. Upon these magnetic bar pieces 13 being assembled into a configuration, such as a letter, numeral or other shape, the bottom face 15 lies just outside of the bottom edge of a pocket well into which the bar piece 13 is assembed and is adapted to engage flush upon a magnetizable board surface. By the use of this magnet, the configuration is thus supported on the magnetizable surface as in the playing of a game thereon or further purposes. The grooves 17 and 18 receive a rib projection lying on the opposite side walls of a pocket well into which the magnetic piece is extended as will be readily seen from the above application. On the assembly of the magnetic pieces into the pocket well of a configuration the stick length 12 is held in the hand by the fingers while the thumb engages the end bar magnet piece 13 and is used to force the magnetic piece home within the pocket well of the configuration.

For the purpose of forming the stick lengths shown in FIGS. 6 and 7 there is provided the present machine indicated generally at 20 through which the strip material 10 is extended to be scored and cut by a scoring and cutting wheel 21. This machine has four upright supports of equal height as respectively indicated generally at 22, 23, 24 and 25 to the upper ends of which there is secured a horizontally-extending machine base plate 26 of relatively heavy and thick metal so as to provide the work surface over which the strip material 10 is passed and worked. The lower ends of the upright legs respectively have outwardly-extending feet portions 27 through which screws 28 are extended to secure the vertical leg supports to a flat table surface.

The power source is an electric motor 30 and a reduction gear unit 31 which has an output shaft 32 and a coupling part 33 that can be fixed by bolts 34 to a corresponding coupling part 35 fixed to one end of a drive shaft 36 journalled in bearing blocks 37 and 38 disposed at one end of the base 26 and respectively secured to the top thereof by screw bolts 39. To the underside of the base plate 26 and secured thereto by the same screw bolts 39 and at the respective opposite sides thereof are bearing blocks 40 and 41 in which a lower roller shaft 42 is journalled.

The top face of the base plate 20 is provided with a long groove 43 extending from one end of the base plate to the other and along which the strip material 10 is fed and retained thereby against lateral displacement while being extended through the groove 43 and worked upon by the scoring and cutting wheel 21, the depth of the groove being exaggerated in the drawing for clarity of illustration. The strip material 10 is worked along and projected through the base plate groove 43 by two sets of combined top and bottom rolls as indicated generally at 44 and 45. The set of rolls 44 includes a top roller 46 which is provided with a surface ring 47 of rubber that engages the upper surface of the strip material 10 traversing the groove 43 to force the strip material therealong. This roller 46 is fixed to the drive shaft 36 by a set screw 46'.

Opposing this top roller 46 and engaging the underface of the strip material 10 is a small drive roller 48 having a rubber external surface 49 and fixed to lower roller shaft 42. This lower drive roller 48 and its rubber surface 49 extends through a slot 50 in the base plate 26 to engage the underside of the strip material 10 traversing the groove 43 on the top surface of the base plate 26. The spacing between the top roller 46 and the bottom roller 48 is such that their rubber surfaces respectively engage the top and bottom sides of the strip material and forced against each other sufficiently to effect a driving action upon the strip material to project it through the groove 43. Because the slot 50 in the plate 26 is short only to accommodate the small drive roller there is little chance of the strip material being crushed through this opening, the strip material 10 having sufficient rigidity to easily traverse the length of this slot 50. The rollers 46 and 48 have line contact with respect to upper and lower surfaces of the strip material 10. In order that these rollers are operated in unison and that the lower roller 48 be driven, the drive shaft 36 has a gear 52 that is fixed to the shaft 36 by a set screw 53 and which engages with a similar gear 54 extending upwardly through an opening 55 in the base plate 26 and secured to the lower drive shaft 42. This gear 54 is secured to the lower shaft by a set screw 54', FIG. 5. Through these gears 52 and 54, the lower roller 48 is operated and driven with the upper roller 46.

The second set 45 of driving rollers are similarly arranged and include an upper shaft 56 that is journalled in bearing blocks 57 and 58 extending upwardly from the top surface of the base plate 26 and on which there is a drive roller 59 having a rubber ring surface 61 and fixed thereto by a set screw 62. The upper shaft 56 has connected to it a drive gear 63 similar to gear 52 and receives its power therefrom through an intermediate pinion gear 64 fixed by a set screw 65 to a short idler shaft 66 which is journalled in upwardly-extending bearing blocks 67 and 68 located at the gear side of the base plate 26 and secured to the base plates by screw bolts 69.

The bearing blocks 57 and 58 are secured to the base plate 26 by screw bolts 71 which also serve to fix to the underside of the base plate 26 bearing blocks 72 and 73 in which a lower shaft 74 is journalled. This shaft 74 carries a small roller 76 having a rubber surface 77 that extends through an elongated slot 78 in the base plate 26 for engagement with the underface of the strip material 10 while the rubber ring surface 61 of the upper roll 59 engages with the top face of strip material. By means of these rollers which are operated in time relation with the preceding set 44 of rollers, the strip material 10 is positively extended through the groove 43 and the base plate 26 as it is projected with the first set 44 of rollers. The lower drive shaft 74 has a gear 79 that meshes with the gear 63 to effect the driving of the lower roller 76.

All this while this rather brittle and rubber-like material is held straight by the side walls of the grooves 43 and is advanced therethrough steadily and evenly by the sets 44 and 45 of rollers and thereby held and prepared for the scoring and cutting operations by the scoring and cutting wheel 21 so that dependence for the movement of the strip material is not made upon the scoring and cutting wheel 21. The material is so brittle that the propelling of the same cannot be effected by the scoring and cutting wheel 21 to so great an extent. However, the wheel 21 is driven in unison with the central rollers in a manner to be soon described. The scoring and cutting wheel 21 is fixed to a drive shaft 81 that is journalled in two bearing blocks 82 and 83 extending upwardly from the upper face of the base plate 26 by screw bolts 84.

Fixed to this drive shaft 81 is a gear 85 of the same diameter as the gears 52 and 63 and driven by the gear 63 through the intermediate gear 86 carried by a short shaft 87 and journalled into two upwardly-extending bearing blocks 88 and 89, on the base plate 26. It will thus be noted that the drive shafts of the rollers and the cutting wheel are driven by interconnecting gears so that the rollers and the cutting wheel 21 fixed by set screw 91 to shaft 81 are driven together simultaneously and at the same speeds to effect an easy and uniform movement and handling of the strip material through the groove 23 on the base plate 26. The upper rollers 46 and 59 and the wheel 21 are of the same diameter and are rotated in the same direction by virtue of the arrangement of the gear wheels. The lower rollers 48 and 76 are arranged to rotate in the opposite direction because they engage and work on the undersurface of the strip material 10.

The cutting wheel 21 is adapted to score and sever two stick lengths 12 from the strip material 10 on each revolution. The scoring and cutting wheel has two series of short scoring teeth 92 and 93 circumferentially spaced over the periphery of the wheel and each series of scoring teeth lying at opposite sides of two long severing teeth projections likewise extending from the periphery of the wheel as indicated at 94 and 95, disposed one hundred and eighty degrees apart from one another and serving after the scoring has been effected by a series of short scoring teeth 92 or 93, to sever the stick length 12 from the strip material 10. The length of the teeth 94 and 95 is exaggerated in the drawing for clarity of illustration. The various teeth crush the top surface of the strip material 10 to different extents, the short teeth 92 and 93 do so only sufficiently to provide a scoring 14 from which a break of the material can be effected when assembling the rubber-like magnetic pieces into the configurations as illustrated in the above pending application, while the long teeth 94 and 95 penetrate the top face of the strip material to a depth sufficient to permit self breakage when the stick passes the end of the base plate to sever the stick length 12. Both the short and long teeth are tapered divergingly from the periphery of the wheel and their scoring and cutting edges are sufficiently wide to more than span the width of the strip material 10 as it is projected through the groove 43 in the base plate 26. The pushing of the scored and cut stick lengths 12 is continued by the sets 44 and 45 of rollers until the finished and stick length 12 drops from the discharge end of the machine as best illustrated in FIG. 3.

The scoring 14 is sufficiently deep to effect easy breaking of the strip into the magnetic pieces 13 as they are assembled into the configurations and at the same time the stick lengths 12 are sufficiently rigid to be easily handled and without breakage except when thumb pressure is applied to the bottom magnet to force it into a configuration pocket well.

It should be apparent that there has been provided a scoring and cutting machine for the handling of rubber-like strip material through which the material is projected, scored and severed without jamming or possible breakage and in which the stick lengths are made ready for use and wherein the scoring and severing is effected in a continuous manner.

While various changes may be made in the detailed construction, of the machine, it shall be understood that such changes shall be within the spirit and scope of the present invention as defined by the appended claim.

What is claimed is:

A machine for scoring and severing rubber-like magnetized strip material into stick lengths comprising a base plate having a guide groove extending longitudinally across the top face thereof for guiding the strip material and longitudinally-spaced slots communicating with the groove from the underside thereof, a set of rubber covered non-magnetic drive rollers extending from above and below the base plate, the lower roller being of smaller diameter and extending through one of the slots in the base plate and the upper roller being of large diameter, said lower and upper rollers engaging respectively with the upper and lower faces of the material for thrust advancing the material along the guide groove of the base plate, power drive means operating said roller means, a second set of rubber covered non-magnetic drive rollers similarly of different diameter respectively engaging the top and underfaces of the strip material through the base plate, drive means interconnecting the second set of drive rollers with the first set of drive rollers, a scoring and severing wheel having two series of scoring teeth peripherally spaced from one another and two severing teeth of longer length than the scoring teeth and disposed one hundred and eighty degrees apart and lying between the series of scoring teeth, said cutting and said severing teeth diverging from the periphery of said wheel and terminating in edges wider than said groove in said base, drive means interconnecting the second set of rollers with the scoring and severing wheel for effecting simultaneous and even driving of the strip material and of the scoring and severing wheel, the drive means for each set of rollers comprising upper and lower gears of equal diameter journalled respectively above and below the base with the lower gear extending through the base and meshing with the upper gear and said drive means interconnecting the said rollers and the scoring and severing wheel comprising an intermediate idler gear interconnecting the upper gears and said scoring and severing wheel having a gear and the drive means for the wheel comprising an idler gear interconnecting the top gear of an uper roller and the gear of the scoring and severing wheel, the gear of the scoring and severing wheel being of the same diameter as that of the upper and lower drive gears for the rollers whereby said upper drive rollers and said scoring and severing wheels travel at identical speeds, while the smaller lower drive rollers travel at a lower speed due to their smaller diameter, to enhance the thrust given to the strip material.

References Cited in the file of this patent
UNITED STATES PATENTS

| | | |
|---|---|---|
| 176,511 | Carpenter et al. | Apr. 25, 1876 |
| 565,186 | Taylor | Aug. 4, 1890 |
| 725,863 | McMillin | Apr. 21, 1903 |
| 1,185,761 | Bewsic | June 6, 1916 |
| 1,518,260 | Hislop | Dec. 9, 1924 |
| 1,762,330 | Fiedler | June 10, 1930 |
| 1,829,456 | Robbins | Oct. 27, 1931 |
| 2,353,390 | Carlin | July 11, 1944 |
| 2,957,379 | Sidebotham et al. | Oct. 25, 1960 |